(12) United States Patent
Zhou et al.

(10) Patent No.: US 12,117,404 B2
(45) Date of Patent: Oct. 15, 2024

(54) PRODUCT INSPECTION SYSTEM AND METHOD

(71) Applicants: Tyco Electronics (Shanghai) Co. Ltd., Shanghai (CN); TE Connectivity Services GmbH, Schaffhausen (CH)

(72) Inventors: Lei (Alex) Zhou, Shanghai (CN); Dandan (Emily) Zhang, Shanghai (CN); Roberto Francisco-Yi Lu, Bellevue, WA (US); Rong Zhang, Shanghai (CN); Qing (Carrie) Zhou, Shanghai (CN)

(73) Assignees: TE Connectivity Solutions GmbH, Schaffhausen (CH); Tyco Electronics (Shanghai) Co. Ltd., Shanghai (CN)

( * ) Notice: Subject to any disclaimer, the term of this patent is extended or adjusted under 35 U.S.C. 154(b) by 204 days.

(21) Appl. No.: 17/864,519

(22) Filed: Jul. 14, 2022

(65) Prior Publication Data
US 2023/0021095 A1 Jan. 19, 2023

(30) Foreign Application Priority Data
Jul. 15, 2021 (CN) .......................... 202110803398.2

(51) Int. Cl.
*G01N 21/95* (2006.01)
*G01N 21/88* (2006.01)

(52) U.S. Cl.
CPC ......... *G01N 21/95* (2013.01); *G01N 21/8806* (2013.01); *G01N 2021/8841* (2013.01); *G01N 2021/9511* (2013.01)

(58) Field of Classification Search
CPC .............. G01N 21/95; G01N 21/8806; G01N 2021/8841; G01N 2021/9511
See application file for complete search history.

(56) References Cited

U.S. PATENT DOCUMENTS

| | | | |
|---|---|---|---|
| 8,564,766 B2 * | 10/2013 | Berghmans | B07C 5/342 356/237.3 |
| 10,386,266 B2 * | 8/2019 | Ikawa | G01M 11/0207 |
| 11,249,030 B2 * | 2/2022 | Van Olmen | G01N 21/255 |
| 2018/0238769 A1 * | 8/2018 | Ikawa | G01M 11/0292 |

* cited by examiner

*Primary Examiner* — Hung V Nguyen
(74) *Attorney, Agent, or Firm* — Barley Snyder

(57) ABSTRACT

A product inspection system includes an image acquisition system having a camera generating an inspection image of a product arranged between a plurality of mirrors. The inspection image has a plurality of sub images of different sides of the product. The inspection system has a calibration member with a plurality of correction patterns on different sides; the camera receives light from the calibration member reflected by the mirrors to generate a calibration image of the calibration member. A computer of the product inspection system receives the inspection image and the calibration image and determines a relative mirror position relationship between the mirrors. The computer forms a single spliced image of the product.

19 Claims, 8 Drawing Sheets

PRODUCT INSPECTION SYSTEM AND METHOD

CROSS-REFERENCE TO RELATED APPLICATION

This application claims the benefit of the filing date under 35 U.S.C. § 119(a)-(d) of Chinese Patent Application No. 202110803398.2, filed on Jul. 15, 2021.

FIELD OF THE INVENTION

The present invention relates to a product inspection system and method capable of splicing a plurality of sub images of different sides of a product to obtain a complete inspection image of the product.

BACKGROUND

Product detection, such as visual inspection, is widely used in industrial production. It involves image acquisition, that is, images of various surfaces of products can be taken according to needs. The captured images can be used for the training of artificial intelligence systems (AI) and machine learning systems (ML), and can also be used in occasions where product surface detection is required.

In the conventional technology, there are mainly two schemes to collect images of multiple surfaces or the entire peripheral surface of the product: the first scheme is to use a single camera to shoot multiple surfaces or peripheral surfaces around the product, or to collect images of multiple surfaces or peripheral surfaces of the product while turning the product, but this results in time-consuming, inconvenient operation and low shooting efficiency; The second scheme uses multiple cameras to capture images of multiple surfaces or peripheral surfaces of the product at the same time, but this leads to problems such as high cost and large operation space.

In addition, the images of multiple surfaces of the product obtained by the two schemes are independent of each other, so the position relationship between them cannot be determined, and it is difficult to correspond or associate the obtained images with the specific features (such as patterns, defects, actual parts, etc.) on the product.

SUMMARY

A product inspection system includes an image acquisition system having a camera generating an inspection image of a product arranged between a plurality of mirrors. The inspection image has a plurality of sub images of different sides of the product. The inspection system has a calibration member with a plurality of correction patterns on different sides; the camera receives light from the calibration member reflected by the mirrors to generate a calibration image of the calibration member. A computer of the product inspection system receives the inspection image and the calibration image and determines a relative mirror position relationship between the mirrors. The computer forms a single spliced image of the product.

BRIEF DESCRIPTION OF THE DRAWINGS

The invention will now be described by way of example with reference to the accompanying Figures, of which.

DETAILED DESCRIPTION OF THE EMBODIMENTS

Figure 1:
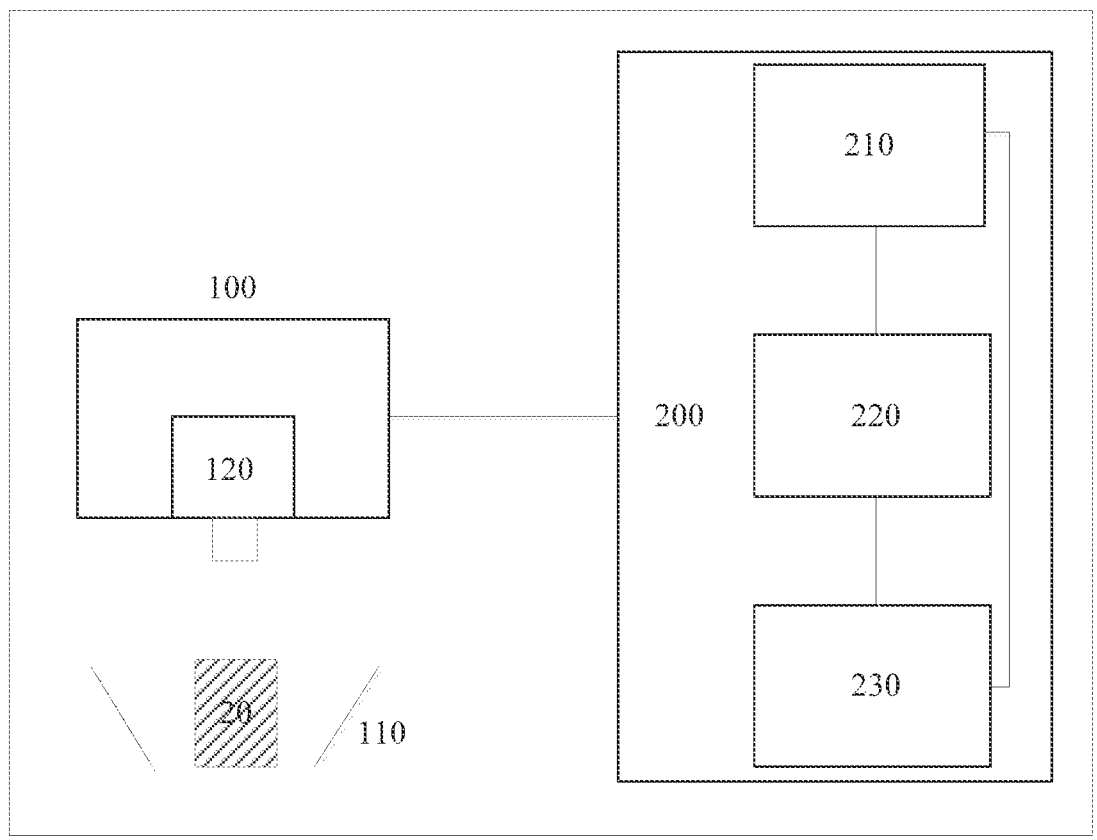
FIG. 1 is a block diagram of a product inspection system according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth to provide a thorough understanding of the disclosed embodiments. It will be apparent, however, that one or more embodiments may be practiced without these specific details. In other instances, well-known structures and devices are schematically shown to simplify the drawing.

Figure 2:
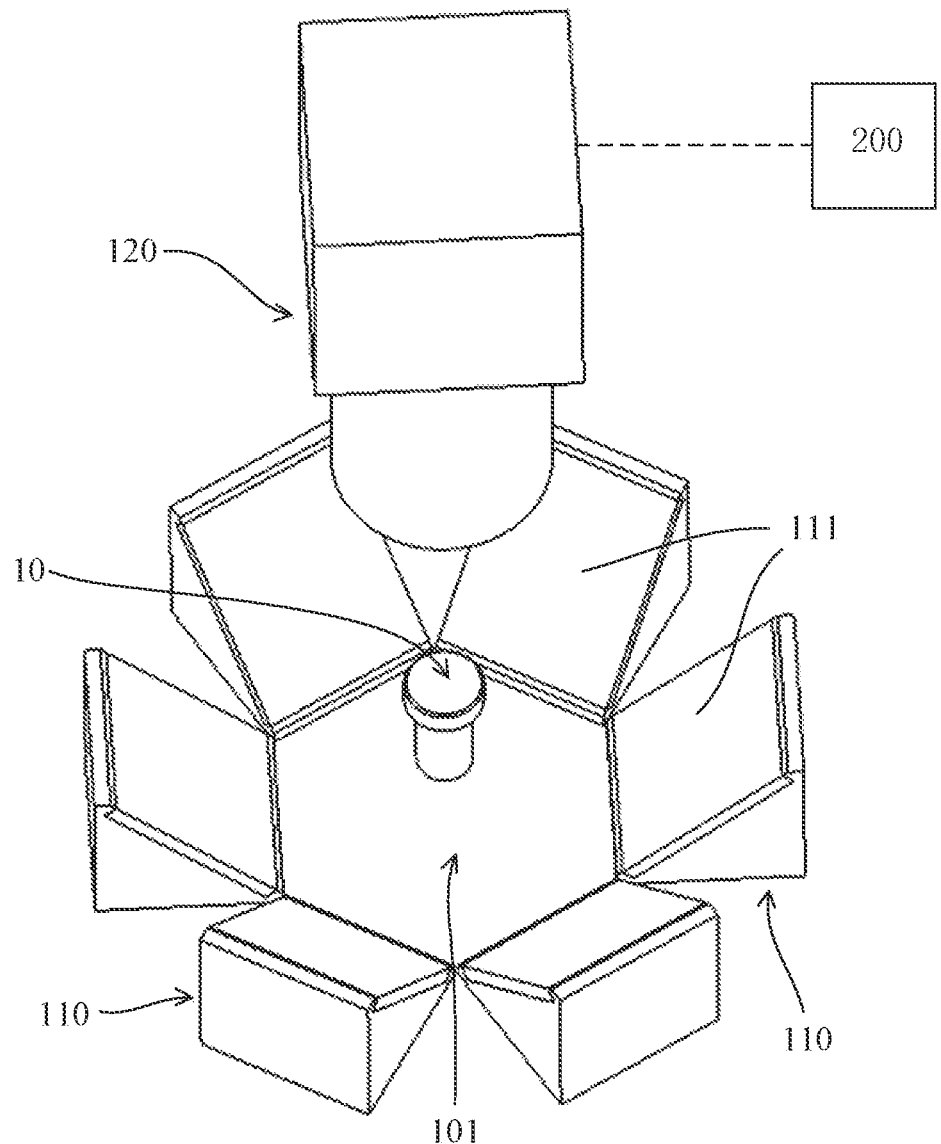
FIG. 2 is a top perspective view of a product inspection system according to an embodiment, showing an arrangement of mirrors.
Figure 3:
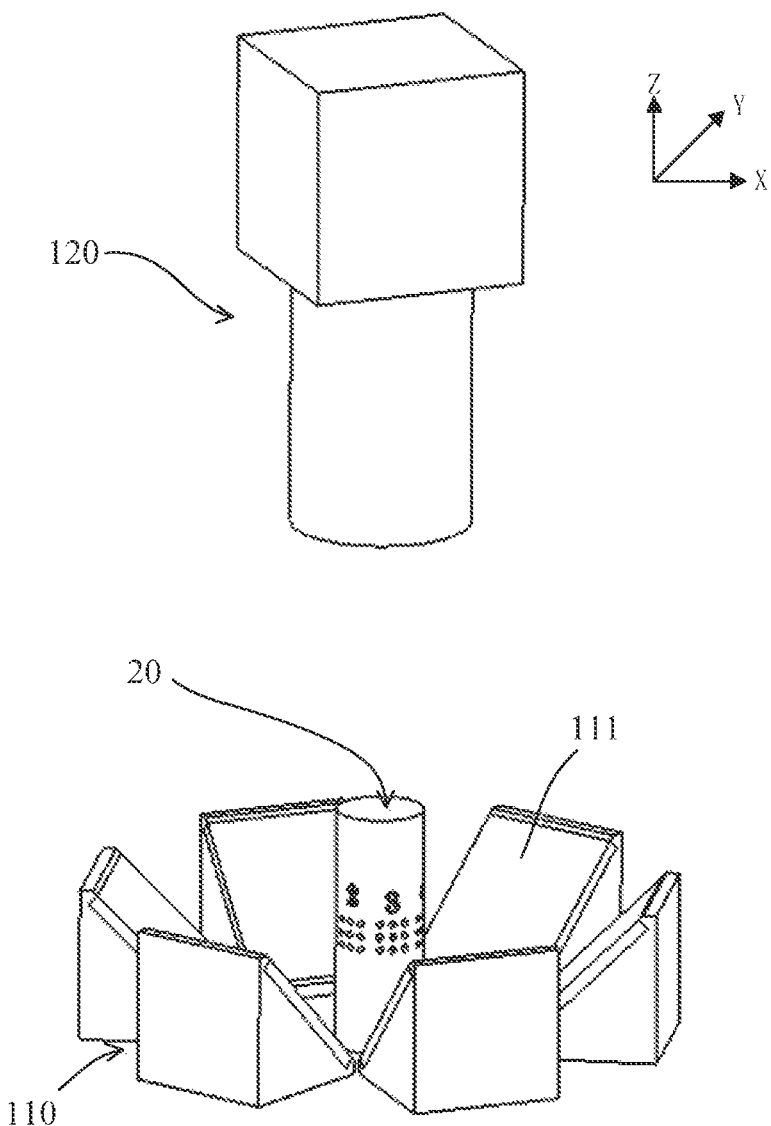
FIG. 3 is a side perspective view of the product inspection system.

As shown in FIGS. 1-3, according to the exemplary embodiment of the present disclosure, there is provided a product inspection system, such as a visual inspection system, which is suitable for multi side inspection or circumferential inspection of products of various shapes, such products can be in the form of a cylinder, a polyhedron, or the like.

As shown in the figures, the product inspection system according to the embodiment of the present disclosure includes an image acquisition system 100 for acquiring a plurality of images of different sides or peripheral surfaces of the product 10. As an example, the image acquisition system 100 includes a plurality of mirrors 110 and a single camera 120, the camera 120 is arranged above the mirrors 110, for example, and the plurality of mirrors 110 are arranged around the product 10 to be inspected and to be placed at an inspection position.

For example, a plurality of mirrors 110 are arranged in a substantially circular shape to define the inspection area 101, and each mirror 110 (specifically, its reflecting surface 111 shown in FIGS. 2 and 3) is positioned or oriented to reflect light from the product 10 placed at a predetermined inspection position in the inspection area 101, such as light from different sides of the product 10 along its circumferential direction, towards the camera 120. In the illustrated embodiment, six mirrors 110 are provided, but the present disclosure is not limited to this, and two, three, four, five or more mirrors may be provided.

In some examples, the plurality of mirrors 11 are arranged to reflect the light of the part to be inspected of the product 10 so that the light from all positions on the complete circumference of the part to be inspected along its circumferential direction is reflected to the camera 120 at least. In other words, the plurality of mirrors 110 are arranged or configured to face the complete circumference of the part to be inspected of the product 10, or all positions on the entire circumference of the part to be inspected of the product 10 can be imaged in the mirror 110, that is, the virtual image of the part to be inspected formed in the mirror includes the virtual image of the complete circumference of the part to be inspected along its circumferential direction. This enables a single camera 120 to "see" the complete circumference of the part to be inspected of the product 10 through a plurality of mirrors 110. The camera 120 receives the light reflected by the mirror 110 to generate an inspection image of the peripheral surface of the part to be inspected of the product 10.

For example, the light from all the peripheral surfaces of a section along the axial direction of the part to be inspected of the product 10 can be captured by the camera 120 through the reflection of the mirror 110. For a product in the form of a polyhedron, the peripheral surface described here may refer to a plurality of sides of the product 10 adjacent to each other in the circumferential direction. For example, when the top or bottom surface of the hexahedron is positioned facing the camera 120, the light from all four sides of the hexahedron can partially or completely enter the lens of the camera 120 through the reflection of the mirror 110.

Thus, in the product inspection system according to the embodiment of the present disclosure, by setting such a mirror, a single camera 120 can obtain or generate views or images of multiple sides or complete circles of the product 10 through a single shooting in a manner similar to a kaleidoscope, without the camera 120 and the product 10 moving in a circumferential direction relative to each other, and without setting multiple cameras along the circumferential direction of the product 10.

For example, these mirrors 110 are evenly spaced around the circumference of the part to be inspected of the product 10 to face different parts or different sides of the part to be inspected of the product 10 along different orientations. The virtual images of different parts or different sides of the product 10 formed in each mirror 110 may be different or partially overlapped with each other. As an example, the mirror 110 may have a reflecting surface 111 oriented to both the part or side of the product 10 to be inspected and the camera 120.

The camera 120 receives the light reflected by the mirror 110 to generate an inspection image 10' of the product 10 (see FIG. 8A), which includes a plurality of sub images of different sides of the product 10, that is, each sub image is associated with or corresponding to different sides of the product 10. The distribution of the acquired sub images on the inspection image 10' is related to the arrangement of the mirrors 110, such as being circular. Thus, through a single shot or image capture by the camera 120, images of multiple different sides or the entire circumference of the product 10 can be obtained from multiple perspectives. Through the obtained inspection image, the product 10 can be inspected, such as visual inspection or determining the features (such as patterns, defects, etc.) on different sides or circumference of the product 10.

In the exemplary embodiment, the plurality of mirrors 110 or their reflecting surfaces 111 are arranged approximately symmetrically around the inspection position or the product 10 placed at the inspection position, such as being arranged in a centrosymmetric or rotationally symmetric manner with respect to the inspection position. In an embodiment, each mirror 110 is the same as each other, specifically, the reflecting surface 111 of each mirror 110 has the same shape (such as a plane mirror), and has the same relative position and orientation with respect to the inspection position or the product 10. For example, as shown in FIGS. 2 and 3, a plurality of mirrors 110 are arranged in a circular shape and evenly spaced from each other, the reflecting surface 111 of each mirror 110 has a rectangular shape (rectangular plane mirror) and faces the sample or camera 120 with the same inclination angle and orientation, the center of the reflecting surface 111 of each mirror 110 is located on the same circle, etc., thereby realizing a symmetrical mirror arrangement around the inspection position or the product 10 placed at the inspection position.

With the help of the position relationship between each mirror 110, the relative position relationship between the sub images of different sides of the product 10 obtained by the camera 120 through each mirror 110 can be determined, so that the position of the feature on the product 10 can be determined based on the obtained inspection image. The position relationship between mirrors 110 can be determined by the position detection device before the product 10 is inspected. It will be understood that in actual use, the position of each mirror 110 may be difficult to accurately detect, or may change due to some reasons.

Figure 4:
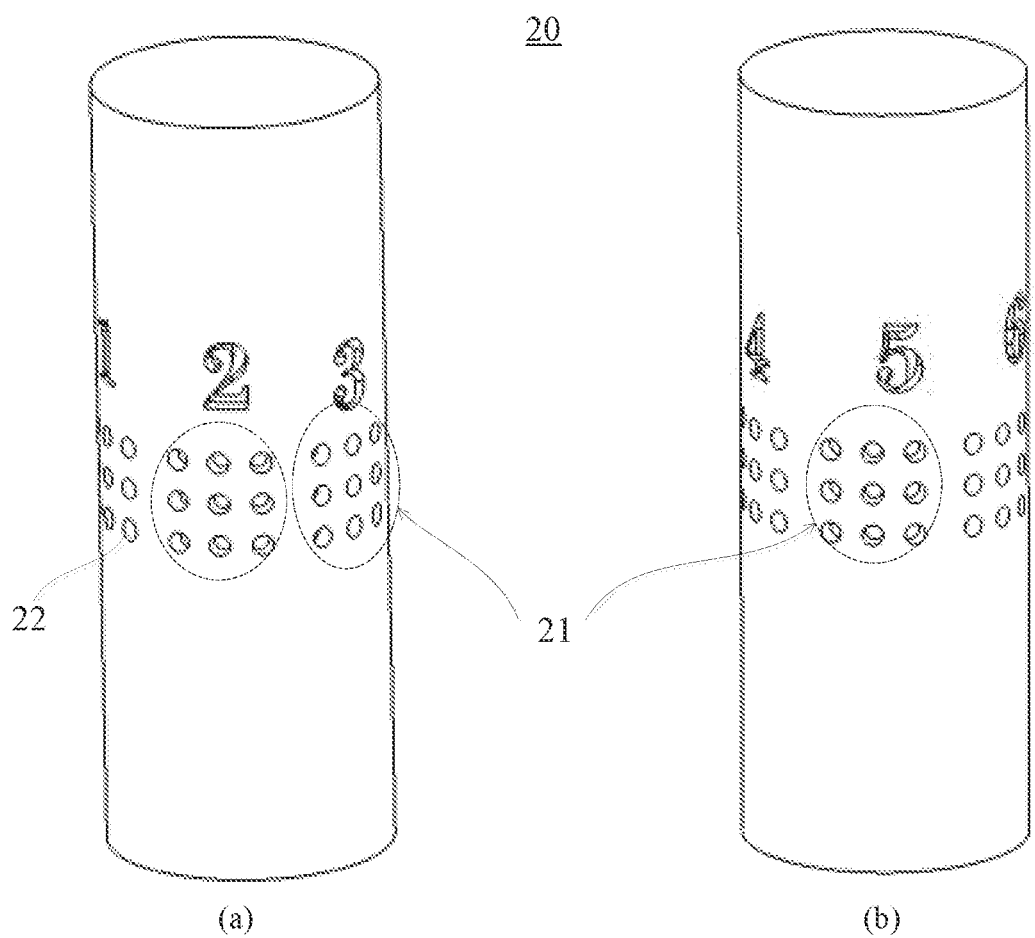
FIG. 4 is a perspective view of a calibration member of a product inspection system according to an embodiment.

In an exemplary embodiment according to the present disclosure, a calibration member 20 may be used to determine the relative position relationship between the various mirrors. The product inspection system according to the embodiment of the present disclosure is also equipped with the calibration member 20. As shown in FIGS. 3 and 4, the calibration member 20 forms a plurality of correction patterns 21 (identified by numbers 1, 2, 3, 4, 5 and 6 respectively in FIG. 4) on different sides along its circumferential direction, and these correction patterns 21 have a predetermined pattern position relationship. In the illustrated embodiment, a plurality of mirrors 110 are arranged to circumferentially surround the product or calibration member placed at the inspection position so that the reflecting surface 111 of each mirror faces one side of the product or one correction pattern of the calibration member. Each mirror 110 may be arranged such that its reflecting surface 111 is inclined to the corresponding side of the product 10 or the corresponding correction pattern 21 of the calibration member 20 to reflect light from the corresponding side or correction pattern towards the camera 120.

Figure 5A:
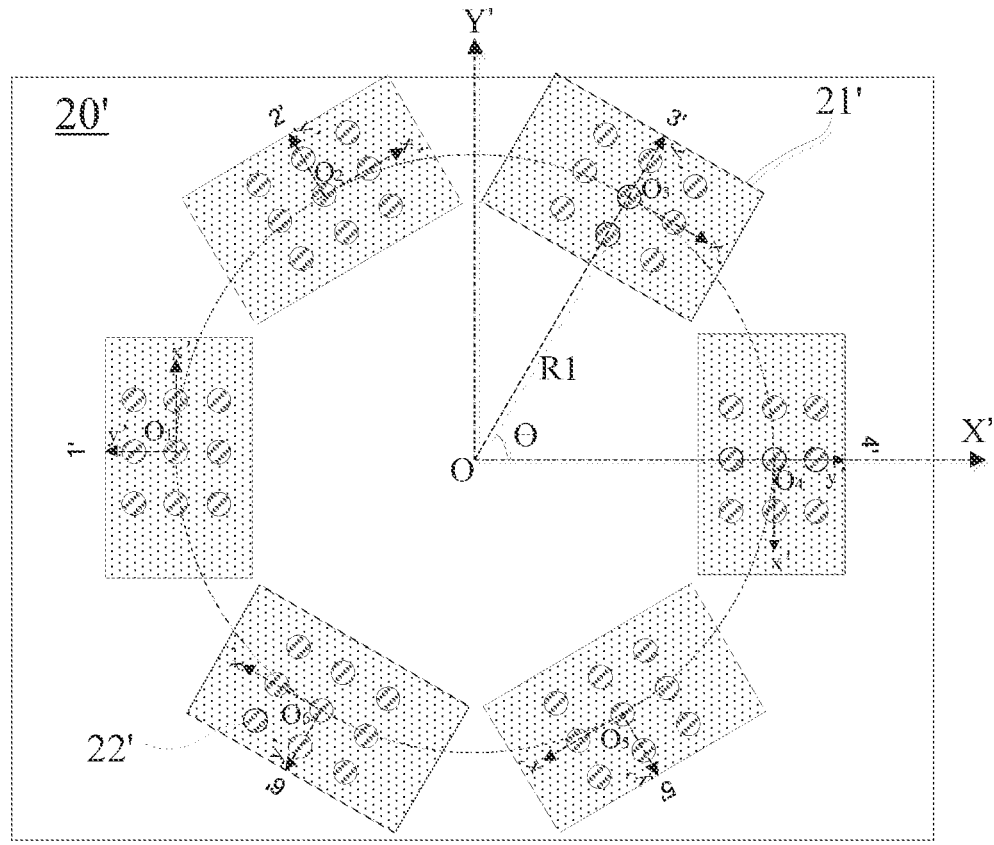
FIG. 5A is a plan schematic diagram of an inspection image of a calibration member simulated or calculated based on the design arrangement of a product inspection system according to an exemplary embodiment.
Figure 6A:
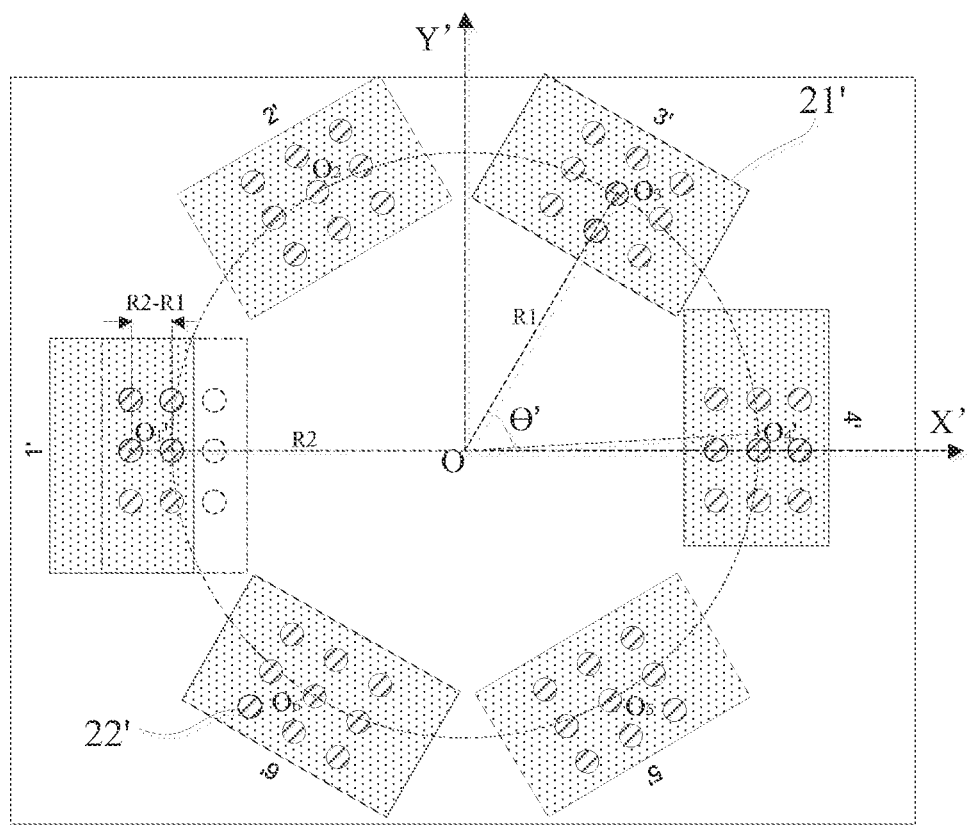
FIG. 6A is a plan schematic diagram of an inspection image of a calibration member obtained using a product inspection system according to an exemplary embodiment.
Figure 6B:
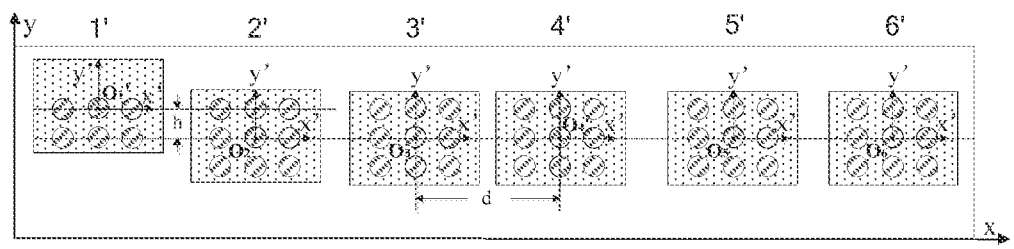
FIG. 6B is a plan view of a spliced image of a calibration member obtained based on the inspection image in FIG. 6A.

In a state where the calibration member 20 is placed at an inspection position in the inspection area 101, as shown in FIG. 3, each correction pattern 21 corresponds to (i.e., faces) one mirror 110, so that each mirror 110 reflects light from the corresponding correction pattern 21 towards the camera 120, which receives light from the calibration member 20 or its correction pattern 21 reflected by the mirror 110 to generate a calibration image 20' of the calibration member 20. The calibration image 20' includes sub calibration images of each correction pattern 21 (see FIGS. 5A and 6A). As shown in FIGS. 5A and 6A, the calibration image 20' includes a plurality of sub calibration images distributed in a ring.

The calibration image 20' is also an inspection image, which is an image of different sides of the calibration member 20 (such as a peripheral part) obtained by the camera 120 through the reflection of the mirror 110, and the sub calibration image is a part of the calibration image 20' including an image of a corresponding correction pattern (for example, an image of a correction pattern obtained by the camera 120 through the reflection of the corresponding mirror 110).

As an example, as shown in FIGS. 3 and 4, the calibration member 20 may include a cylindrical member, such as a cylinder, which is suitable for being placed vertically at an inspection position, for example, and a plurality of correction patterns 21 are formed on the outer peripheral surface of the cylindrical member spaced in a circumferential direction, for example, evenly spaced along the circumferential direction of the calibration member. In the shown embodiment, each correction pattern 21 is the same pattern as each other. When the calibration member 20 is vertically placed at the inspection position or the calibration member 20 is placed at the inspection position in a posture suitable for inspection, the centers of each correction pattern 21 are spaced along the circumferential direction of the cylindrical member and located at the same height, such as on the same circle or polygon.

In the embodiment shown in FIG. 4, each correction pattern 21 includes an array of dot patterns 22 arranged in multiple rows and columns, such as 3×3 rectangular lattice. As an example, the dot pattern 22 may include bulges, bumps, depressions, openings, etc., but the present disclosure is not limited to this. When the calibration member 20 is vertically placed at the inspection position or when the calibration member 20 is placed at the inspection position in a posture suitable for inspection, the dot patterns 22 with the same relative position relative to the corresponding center in each correction pattern are located at the same height or on the same circle or polygon. For example, in the illustrated embodiment, the dot patterns 22 of the corresponding rows (first to third rows) of each correction pattern 21 are located at the same height or on the same circle or polygon, the columns of each correction pattern 21 extend in the vertical direction, the point patterns 22 of each correction pattern 21 have the same spacing, and the spacing of the point patterns 22 of each correction pattern 21 is the same.

As shown in FIGS. 1 and 2, the product inspection system according to the embodiment of the present disclosure also includes a computer 200 (such as a workstation) which communicates with the image acquisition system 100 (e.g., communicates with the camera 120) to receive the inspection image 10' and the calibration image 20'. According to an example of the present disclosure, the computer 200 is configured to determine a relative mirror position relationship between the corresponding plurality of mirrors 110 based on a predetermined pattern position relationship between the correction patterns 21 of the calibration member 20 and the obtained calibration image 20', and to splice a plurality of sub images in the obtained inspection image 10' of the product 10 based on the determined relative mirror position relationship to form a single spliced image of the product 10. The relative position relationship of each sub image on the spliced image corresponds to or is consistent with the actual position relationship of the side associated with each sub image of the product 10. For example, the arrangement order of each sub image on the spliced image corresponds to or is consistent with the arrangement order of the side associated with each sub image in the circumferential direction of the product 10, so that the features (such as patterns, defects, etc., and their positions) on the product 10 can be checked or determined according to the spliced image. In the illustrated embodiment, an X-Y coordinate system is established on the spliced image, and each sub image is arranged in the X direction on the spliced image. For example, the X direction on the spliced image may correspond to or be associated with the circumferential direction of the product, and the position in the Y direction may correspond to or be associated with the Z position in the XYZ coordinate system of the product inspection system.

According to the exemplary embodiment of the present disclosure, the relative position relationship of each sub image on the spliced image is determined based on the relative position relationship between each mirror 110 determined by the calibration member 20, so that the part actually captured by camera 120 on the product 10 can be determined according to the spliced image, that is, each sub image on the spliced image can be associated with the part actually captured by camera 120 on the product 10. Thus, the features on the product 10 can be accurately inspected or determined (such as positioning).

As shown in FIG. 1, the computer 200 may include an image processor 210 configured to determine the relative position relationship between two adjacent mirrors 110 corresponding to the two adjacent sub calibration images based on the relative position relationship between the two adjacent sub calibration images of the calibration image 20'.

In an exemplary embodiment, the image processor 210 may be configured to determine, based on the position difference between two adjacent sub calibration images in the radial direction relative to the center of the calibration image 20', the relative position in the Y direction on the spliced image between the two sub images formed by the two adjacent mirrors 110 corresponding to the two adjacent sub calibration images among the plurality of sub images. For example, the image processor 210 may be configured to determine a height difference between the two adjacent mirrors 110 based on the position difference and determine, based on the determined height difference, the relative position in the Y direction on the spliced image between the two sub images formed by the two adjacent mirrors 110 in the plurality of sub images.

The image processor 210 may also be configured to determine, based on the relative positions between the two adjacent sub calibration images in the circumferential direction relative to the center of the calibration image 20, the relative positions in the X direction on the spliced image between the two sub images formed by the two adjacent mirrors 110 corresponding to the two adjacent sub calibration images among the plurality of sub images. For example, the image processor 210 may be configured to determine the relative horizontal position between the two adjacent mirrors 110 based on the relative position between the two adjacent sub calibration images in the circumferential direction relative to the center of the calibration image 20', and determine the relative position in the X direction between the two sub images formed by the two adjacent mirrors 110 in the plurality of sub images based on the determined relative horizontal position between the two adjacent mirrors 110.

Hereinafter, the splicing of inspection images will be described with reference to FIGS. 5A to 6B. FIG. 5A is a calibration image (i.e., an inspection image) of the above calibration member 20 obtained by simulation or calculation based on the design arrangement (such as an ideal arrangement) of the product inspection system, on which an X'-Y' coordinate system can be established. The inspection image shown in FIG. 5A may also correspond to a case where a desired (as designed) or predetermined relative position relationship is maintained between a plurality of mirrors 110 of the product inspection system, for example, the same plurality of mirrors 110 are arranged in a centrosymmetric or rotationally symmetric manner with respect to the inspection position. At this time, each sub calibration image 21' (as marked by 1', 2', 3', 4', 5' and 6' respectively in the figure to distinguish) is centrosymmetric or rotationally symmetric with respect to the 0 point on the obtained calibration image 20', and the centers O1~O6 of each sub calibration image coincide with the image 22' of the central point pattern of the corresponding correction pattern and are located on the same circle with R1 as the radius, and each sub calibration image has the same angular spacing $\Theta_c$. At this time, the X'-Y' coordinate system can be established on each sub calibration image 21' according to the right-hand rule. The calibration image in FIG. 5A is consistent with the desired or designed mirror arrangement and can be used as a reference image. Based on the design arrangement of the product inspection system (including the design arrangement of the mirror, the arrangement of the correction pattern of the calibration member, etc.), such a reference image can be calculated or simulated in advance, and the reference image can be stored in the storage device for backup.

Figure 5B:
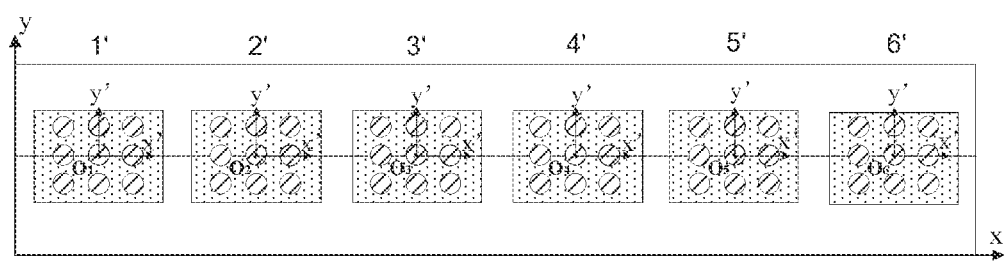
FIG. 5B is a plan view of a spliced image of a calibration member obtained based on the inspection image of FIG. 5A.

For the calibration image shown in FIG. 5A, the obtained sub calibration images 21' may be spliced according to the arrangement order (E. G., clockwise or counterclockwise) on the calibration image 20' to form a spliced image based on the predetermined pattern position relationship between the correction patterns 21 of the calibration member 20, that is, the centers of the correction patterns 21 are located on the same circle or polygon or at the same height and at the same spacing (angular spacing). Make the centers O1~O6 of each sub calibration image 21' lie on the same straight line in the X direction on the spliced image and are spaced at the same distance, and each sub calibration image 21' is in the same orientation on the spliced image (for example, the coordinate axes of each x'-y' coordinate system face the same direction), as shown in FIG. 5B.

FIG. 6A is a calibration image (i.e., an inspection image) of the calibration member 20 obtained when the relative positions of the plurality of mirrors 110 of the product inspection system change with respect to FIG. 5A. As shown in FIG. 6A, the center O1' of the sub calibration image 21' (identified as "1'") obtained by the camera 120 of the correction pattern 21 identified as "1" on the calibration member 20 and the centers O2~O6 of the sub calibration image 21' obtained by the camera 120 of other correction patterns are located on different circles, that is, on a circle with R2 as the radius, and there is a radial position difference R2−R1 relative to the reference image of FIG. 5A. This indicates that the mirror 110 corresponding to the correction pattern 21 marked "1" on the calibration member 20 changes in height with respect to the adjacent mirror (in the case of FIG. 6A, it rises with respect to the adjacent mirror), and the mirror reflects the light from the upper part of the correction pattern 21 marked "1" to the camera 120. Therefore, in the spliced image shown in FIG. 6B, the sub calibration image 21' (identified as "1'") obtained by the camera 120 of the correction pattern 21 identified as "1" on the calibration member 20 has a displacement h in the Y direction relative to other sub calibration images to correspond to the height change of the mirror 110. Thus, the relative height position relationship between adjacent mirrors 110 corresponding to adjacent sub calibration images can be determined based on the relative radial position between adjacent sub calibration images of the calibration image.

In FIG. 6A, the sub calibration image 21' (identified as "4'") obtained by the camera 120 of the correction pattern 21 identified as "4" on the calibration member 20 is closer to the sub calibration image 21' (identified as "3'") obtained by the camera 120 of the correction pattern 21 identified as "3" on the calibration member 20, that is, the angular spacing between the two is changed from $\Theta$ to $\Theta'$. This indicates that the mirror 110 corresponding to the correction pattern 21 marked "4" on the calibration member 20 shifts or approaches the mirror 110 corresponding to the correction pattern 21 marked "3" on the calibration member 20 in the circumferential direction. Therefore, in the spliced image shown in FIG. 6B, the distance D in the X direction between the sub calibration image 21' (identified as "4'") obtained by the camera 120 of the correction pattern 21 identified as "4" on the calibration member 20 and the sub calibration image 21' (identified as "3'") obtained by the camera 120 of the correction pattern 21 identified as "3" is reduced relative to the distance in the X direction between other adjacent sub calibration images 21' on the spliced image, to correspond to the change of the spacing or angular spacing in the circumferential direction between the mirrors 110. Thus, the relative angular position relationship between adjacent mirrors 110 corresponding to adjacent sub calibration images can be determined based on the relative angular position between adjacent sub calibration images of the calibration image.

Figure 8A:
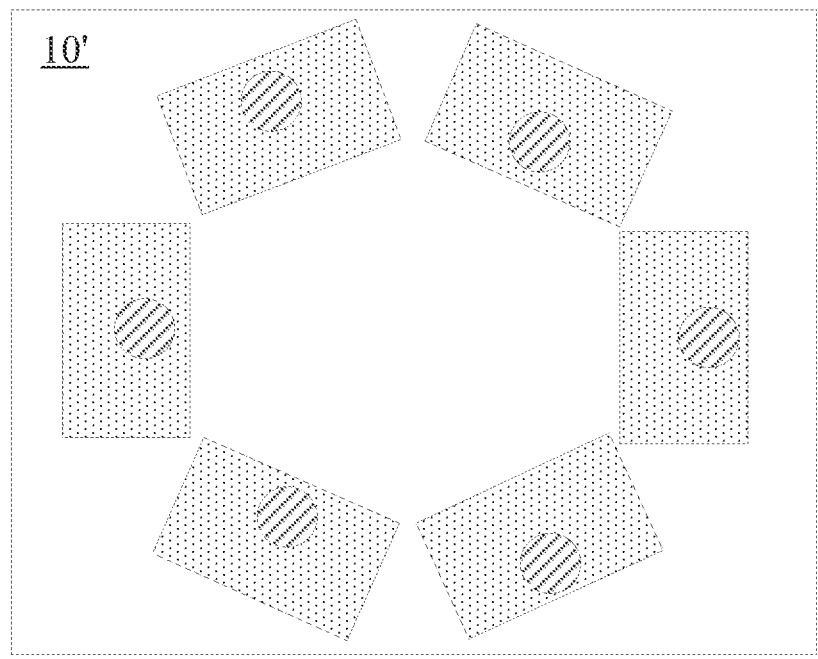
FIG. 8A is a plan schematic diagram showing an inspection image of a product obtained using a product inspection system according to an embodiment.
Figure 8B:
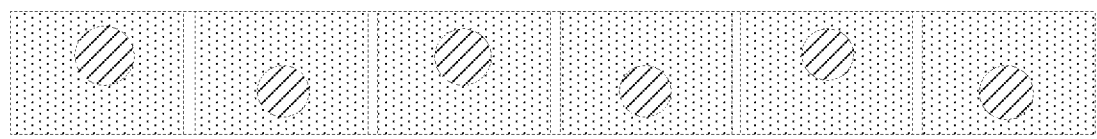
FIG. 8B is a plan view of a spliced image of a calibration member obtained based on the inspection image in FIG. 8A.

Therefore, a mapping relationship can be established between the determined displacement h and spacing d and the relative position between the mirrors 110. Then, for the inspection image of the product 10, each sub image of the inspection image of the product 10 is spliced in the same way based on the above relative position relationship between the determined mirrors 110, as shown in FIG. 8A and FIG. 8B. For example, in the spliced image of a product, the sub image formed by a mirror 110 associated with the displacement h is shifted by a distance equal to h in the Y direction relative to the sub image formed by other or adjacent mirrors 110, and the spacing between the sub images formed by adjacent mirrors 110 associated with the spacing d is adjusted to d. The spliced image thus obtained more accurately reflects or represents the image of the part of the product 10 actually captured by the camera 120.

During the above stitching, the distance between the centers of the two adjacent sub calibration images 21' or sub images in the X direction on the spliced image may be associated with or corresponding to (e.g., equal to or proportional to) the arc length corresponding to the angular distance between the two adjacent sub calibration images 21' or sub images on the calibration image or the inspection image. Alternatively, the spacing in the X direction may be associated with or correspond to the circumferential spacing or angular spacing between the centers of the sides of adjacent correction patterns or products based on the scaling parameters of the image capture system (it can be understood that the scaling parameters can be calculated by using known or conventional methods, such as the imaging parameters of the camera 120, the position relative to the mirror 110, the arrangement of the mirror 110, the position of the mirror 110 relative to the calibration member or the product 10, etc.). Similarly, the distance between the centers of the two adjacent sub calibration images 21' or sub images in the Y direction on the spliced image may be associated with or corresponding to (E. G., equal to or proportional to) the radial distance between the two adjacent sub calibration images 21' or sub images on the correction image or the inspection image. Alternatively, the spacing in the Y direction may be associated with or correspond to (E. G., equal to or proportional to) the spacing in the height direction (z direction) as shown in FIGS. 2 and 3 between the centers of the sides of adjacent correction patterns or products based on the scaling parameters of the image capture system.

In addition to the above-mentioned height position changes or angular position changes between the mirrors 110, the mirrors 110 may also rotate or turn (e.g. rotate or turn around the X, y or Z axis in FIG. 3), which is inconsistent with the desired orientation. Such rotation or turn may cause, for example, deformation, such as scaling, of the pattern in the sub image of the product or the sub calibration image 21' of the calibration member 20 formed by the mirror 110. The scaling of the image or pattern may also be caused by the displacement of the mirror 110 close to or away from the inspected product 10. The image processor 210 can process this deformation to make the spliced image match the image on the product 10. For example, when the relative position relationship of the mirrors 110 is determined using the calibration member 20, the mirrors 110 associated with the pattern deformation can be determined, the deformation parameters (such as the scaling factor) of the sub calibration image 21' of the calibration member 20 relative to the above reference image can be calculated, and the pattern in the sub image formed by the mirror 110 causing the pattern deformation can be applied with reverse deformation (such as reverse scaling) before splicing the sub images of the product 10, to make the pattern in the subsequent spliced image consistent with the actual pattern on the product 10.

Figure 7:
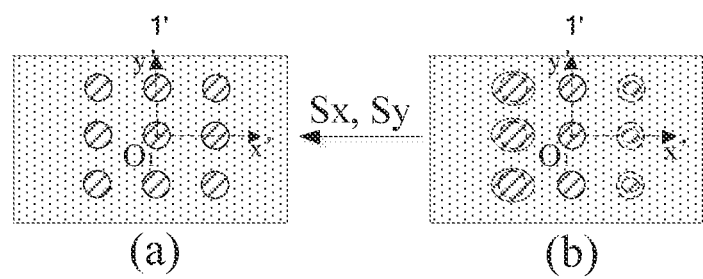
FIG. 7 is a schematic diagram of a scaling factor of an image for acquiring a pattern of a calibration member according to an embodiment of the present disclosure.

A case where the mirror 110 corresponding to or facing the correction pattern 21 marked "1" on the calibration member 20 rotates in the z-axis direction will be described below with reference to FIG. 7. Part (b) of FIG. 7 shows a case where a partial pattern in the sub calibration image 21' is deformed, and part (a) of FIG. 7 shows an undeformed pattern in the corresponding reference image. For example, compared with the reference image in part (b), the size of the image in the left column in the X' and Y' directions becomes larger, while the size of the image in the right column in the X' and Y' directions becomes larger. By comparing the deformed image in part (b) of FIG. 7 with the undistorted image (such as the image in the middle column), or with the corresponding reference image shown in part (a) of FIG. 7, it is possible to determine the scaling factors Sx and Sy in the X' and Y' directions of each pattern or part on the image shown in part (b) of FIG. 7.

Then, after obtaining the inspection image of the product 10, a reverse deformation is applied to the pattern in the sub image formed by the mirror 110 causing the above pattern deformation (E. G., the pattern in the sub image is inversely enlarged or reduced in proportion to the absolute values of the scaling factors Sx and Sy), so that the pattern in the sub image is consistent with the actual pattern on the product 10 (E. G., in a similar shape or pattern).

Figure 9:
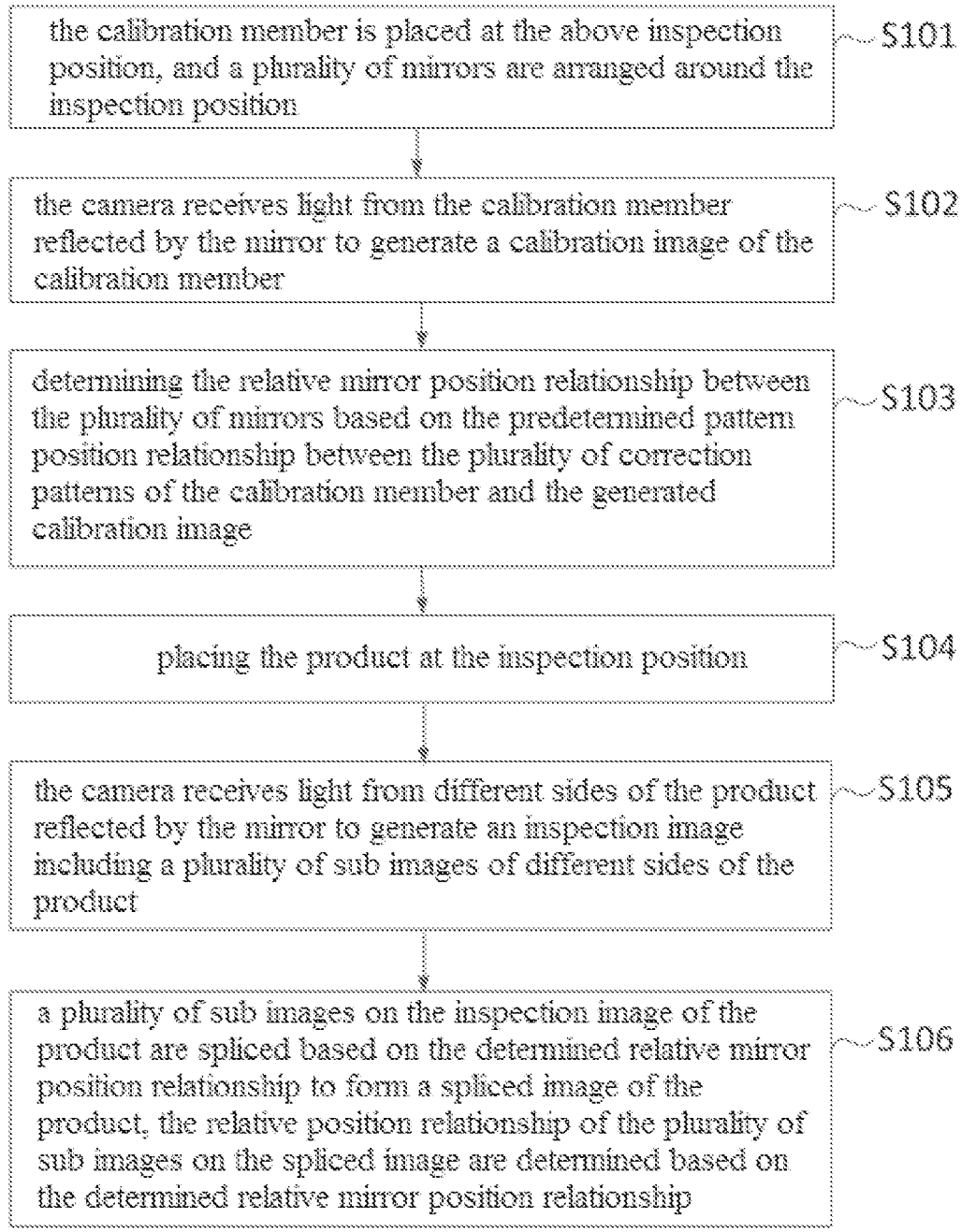
FIG. 9 is a flowchart showing a method of inspecting a product using a product inspection system according to an embodiment.

FIG. 9 shows a flow of a method of inspecting a product 10 using a product inspection system according to an exemplary embodiment of the present disclosure. As shown in the figure, the method includes the following steps:

S101: the calibration member 20 is placed at the above inspection position, and a plurality of mirrors 110 are arranged around the inspection position;

S102: the camera 120 receives light from the calibration member 20 reflected by the mirror 110 to generate a calibration image 20' of the calibration member 20;

S103: determining the relative mirror position relationship between the plurality of mirrors 110 based on the predetermined pattern position relationship between the plurality of correction patterns of the calibration member 20 and the generated calibration image;

S104: placing the product 10 at the inspection position;

S105: the camera 120 receives light from different sides of the product 10 reflected by the mirror 110 to generate an inspection image 10' including a plurality of sub images of different sides of the product 10 (see FIG. 8A);

S106: a plurality of sub images on the inspection image of the product 10 are spliced based on the determined relative mirror position relationship to form a spliced image of the product (see FIG. 8B), wherein, the relative positions of the plurality of sub images on the spliced image are determined based on the determined relative mirror position relationship, so that the relative positions of the plurality of sub images on the spliced image are consistent to the patterns, features or parts actually photographed by the camera on the product 10, so that the features on the product 10 can be located or inspected more accurately and quickly.

In the above method, the product 10 or the calibration member 20 may be placed so that the reflecting surface 111 of each mirror 110 faces one side of the product or one correction pattern 21 of the calibration member 20 to reflect light from the corresponding side or correction pattern towards the camera 120.

A suitable calibration member 20 may be selected or designed, such as a cylindrical member suitable for being vertically placed at the inspection position, on which a plurality of correction patterns may be the same as each other. In operation, the calibration member 20 is placed so that the centers of its multiple correction patterns are at the same height.

For example, the obtained calibration image includes a plurality of sub calibration images 21' distributed in a ring, and each sub calibration image is an image of one correction pattern 21 obtained by the camera through the reflection of the corresponding mirror 110.

As described above, the computer 200 of the product inspection system may be provided with an image processor 210, and in the above method, the image processor 210 may determine the relative position relationship between the two adjacent mirrors 110 corresponding to the two adjacent sub calibration images 21' based on the relative position relationship between the two adjacent sub calibration images 21' of the calibration image.

Illustratively, the image processor 210 may determine, based on the position difference between the two adjacent sub calibration images 21' in the radial direction relative to the center of the calibration image, the relative position in the Y direction on the spliced image between the two sub images formed by the two adjacent mirrors 110 corresponding to the two adjacent sub calibration images 21' among the plurality of sub images. The image processor 210 may also determine, based on the relative position between the two adjacent sub calibration images 21' in the circumferential direction relative to the center of the calibration image, the relative position in the X direction on the spliced image between the two sub images formed by the two adjacent mirrors corresponding to the two adjacent sub calibration images 21'.

In some examples, determining the relative position in the Y direction by the image processor based on the position difference may include: determining the height difference between the two adjacent mirrors based on the position difference; and determining, based on the determined height difference, the relative position in the Y direction on the spliced image between the two sub images formed by the two adjacent mirrors in the plurality of sub images.

In some examples, determining the relative position in the X direction by the image processor may include: determining the relative horizontal position between the two adjacent mirrors based on the relative position between the two adjacent sub calibration images in the circumferential direction relative to the center of the calibration image; and determining, based on the determined relative horizontal position between the two adjacent mirrors, the relative position in the X direction on the spliced image between the two sub images formed by the two adjacent mirrors in the plurality of sub images.

The computer of the product inspection system may also include a display device and/or a storage device communicating with the image processor, which may display the spliced image, and/or may also display the inspection image, calibration image or reference image for the operator to view or process. At least one of the predetermined pattern position relationship, the inspection image, the calibration image, the reference image, and the relative mirror position relationship may be stored in the storage device.

Although the embodiments of the present disclosure have been shown and described, it can be understood by those skilled in the art that these embodiments can be changed without departing from the principle and spirit of the present disclosure, and the scope of protection of the present disclosure is limited by the appended claims and their equivalents. In addition, it should be noted that the terms "including", "including" and "having" used herein do not exclude other elements or steps unless otherwise specified. In addition, any element label of the claim should not be understood as limiting the scope of protection of the present disclosure.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and preceded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A product inspection system, comprising:
  an image acquisition system having a plurality of mirrors arranged around a product to be inspected that is placed at an inspection position and a camera arranged above the mirrors, each mirror is positioned to reflect light from different sides of the product along a circumferential direction of the product towards the camera, the camera receives the light reflected by the mirrors to generate an inspection image of the product, the inspection image has a plurality of sub images of different sides of the product;
  a calibration member having a plurality of correction patterns on different sides along a circumferential direction of the calibration member, the correction patterns have a predetermined pattern position relationship, each correction pattern corresponds to one of the plurality of mirrors when the calibration member is placed at the inspection position, each mirror reflects light from a corresponding correction pattern toward the camera, the camera receives light from the calibration member reflected by the mirror to generate a calibration image of the calibration member; and
  a computer communicating with the image acquisition system to receive the inspection image and the calibration image, the computer determines a relative mirror position relationship between the mirrors based on the predetermined pattern position relationship and the calibration image, and splices the plurality of sub images based on the determined relative mirror position relationship to form a single spliced image of the product, a relative position relationship of the plurality of sub images on the spliced image is determined based on the determined relative mirror position relationship.

2. The product inspection system of claim 1, wherein the mirrors are arranged to circumferentially surround the product or the calibration member placed at the inspection position so that a reflecting surface of each mirror faces one side of the product or one correction pattern of the calibration member.

3. The product inspection system of claim 2, wherein each mirror is arranged with the reflecting surface inclined to a corresponding side of the product or the corresponding correction pattern of the calibration member to reflect light from the corresponding side or correction pattern towards the camera.

4. The product inspection system of claim 1, wherein the calibration member is a cylindrical member vertically placed at the inspection position, the correction patterns are the same as each other, and a plurality of centers of the correction patterns are spaced along a circumferential direction of the cylindrical member and located at a same height.

5. The product inspection system of claim 4, wherein each correction pattern includes an array of point patterns arranged in multiple rows and columns, the point patterns having a same relative position with respect to the center in each correction pattern are located at the same height.

6. The product inspection system of claim 4, wherein the plurality of correction patterns are evenly spaced along the circumferential direction of the calibration member, and/or the centers of each correction pattern are located on the same circle.

7. The product inspection system of claim 1, wherein the calibration image includes a plurality of sub calibration images distributed in a ring, each sub calibration image is an image of the correction pattern obtained by the camera through a reflection of the corresponding mirror.

8. The product inspection system of claim 7, wherein the computer comprises an image processor determining a relative position relationship between two adjacent mirrors corresponding to two adjacent sub calibration images based on a relative position relationship between the two adjacent sub calibration images.

9. The product inspection system of claim 8, wherein the image processor:
- determines, based on a position difference between the two adjacent sub calibration images in a radial direction relative to a center of the calibration image, a relative position in a Y direction on the spliced image between the two sub images formed by the two adjacent mirrors corresponding to the two adjacent sub calibration images; and
- determines, based on the relative position between the two adjacent sub calibration images in a circumferential direction relative to the center of the calibration image, a relative position in an X direction on the spliced image between the two sub images formed by the two adjacent mirrors corresponding to the two adjacent sub calibration images.

10. The product inspection system of claim 9, wherein the image processor:
- determines a height difference between the two adjacent mirrors based on the position difference; and
- based on the determined height difference, determines the relative position in the Y direction on the spliced image between the two sub images formed by the two adjacent mirrors.

11. The product inspection system of claim 10, wherein the image processor:
- determines a relative horizontal position between the two adjacent mirrors based on the relative position between the two adjacent sub calibration images in the circumferential direction relative to the center of the calibration image; and
- based on the determined relative horizontal position between the two adjacent mirrors, determining the relative position in the X direction on the spliced image between the two sub images formed by the two adjacent mirrors.

12. The product inspection system of claim 1, wherein the computer includes:
- a display device displaying the inspection image, the calibration image, and the spliced image; and/or
- a storage device storing at least one of the predetermined pattern position relationship, the inspection image, the calibration image, and the relative mirror position relationship.

13. A method of inspecting a product using the product inspection system of claim 1, comprising:
- placing the calibration member at the inspection position, the plurality of mirrors are arranged around the inspection position;
- receiving light from the calibration member reflected by a mirror by a camera to generate a calibration image of the calibration member;
- determining a relative mirror position relationship between the plurality of mirrors based on the predetermined pattern position relationship and the calibration image;
- placing the product at the inspection position;
- receiving light from different sides of the product reflected by the mirror by the camera to generate an inspection image including a plurality of sub images of different sides of the product; and
- splicing the plurality of sub images based on the determined relative mirror position relationship to form a spliced image of the product, the relative position relationship of the plurality of sub images on the spliced image is determined based on the determined relative mirror position relationship.

14. The method of claim 13, wherein the product or the calibration member is placed so that a reflecting surface of each mirror faces one side of the product or one correction pattern of the calibration member to reflect light from the corresponding side or correction pattern towards the camera.

15. The method of claim 13, wherein the calibration image includes a plurality of sub calibration images distributed in a ring, and each sub calibration image is an image of the correction pattern obtained by the camera through the reflection of the corresponding mirror.

16. The method of claim 15, wherein the computer comprises an image processor, and the method further comprises determining a relative position relationship between two adjacent mirrors corresponding to two adjacent sub calibration images based on a relative position relationship between the two adjacent sub calibration images.

17. The method of claim 16, further comprising:
- determining with the image processor, based on a position difference between the two adjacent sub calibration images in a radial direction relative to the center of the calibration image, a relative position in a Y direction on the spliced image between the two sub images formed by two adjacent mirrors corresponding to the two adjacent sub calibration images; and
- determining with the image processor, based on the relative position between the two adjacent sub calibration images in a circumferential direction relative to the center of the calibration image, a relative position in an X direction on the spliced image between the two sub images formed by the two adjacent mirrors corresponding to the two adjacent sub calibration images.

18. The method of claim 17, wherein determining the relative position in the Y direction by the image processor based on the position difference comprises:
- determining a height difference between the two adjacent mirrors based on the position difference; and
- based on the determined height difference, determining the relative position in the Y direction on the spliced image between the two sub images formed by the two adjacent mirrors.

19. The method of claim 18, wherein determining the relative position in the X direction by the image processor comprises:
- determining a relative horizontal position between the two adjacent mirrors based on the relative position between the two adjacent sub calibration images in the circumferential direction relative to the center of the calibration image; and
- based on the determined relative horizontal position between the two adjacent mirrors, determining the relative position in the X direction on the spliced image between the two sub images formed by the two adjacent mirrors.

* * * * *